United States Patent [19]

Pohle

[11] Patent Number: 4,482,208

[45] Date of Patent: Nov. 13, 1984

[54] LATERAL TRANSFER SYSTEM FOR AN OPTICAL BEAM

[75] Inventor: Richard H. Pohle, Monta Vista, Calif.

[73] Assignee: Lockheed Missiles & Space Co., Inc., Sunnyvale, Calif.

[21] Appl. No.: 419,554

[22] Filed: Sep. 17, 1982

[51] Int. Cl.³ .............................................. G02B 5/04
[52] U.S. Cl. .................................... 350/286; 350/616
[58] Field of Search ................. 350/286, 299; 356/399

[56] References Cited

PUBLICATIONS

Definition of a Prism, "The Optical Industry and Systems Purchasing Directory", 1981.
Definition of a Prism, Websters New Collegiate Dictionary, 1977.
Yoder, "High Precision 10-cm Aperture Penta & Roof-Penta Mirror Assemblies", Applied Optics, vol. 10, No. 10, Oct. 1971.
Southall, *Mirrors, Prisms and Lenses,* MacMillan Co. New York, 1923, p. 113.

*Primary Examiner*—John K. Corbin
*Assistant Examiner*—Lynn Vandenburgh Kent
*Attorney, Agent, or Firm*—John J. Morrissey

[57] ABSTRACT

A lateral transfer system for an optical beam comprises bipentaprisms (10) and (11) secured to opposite ends of an elongate transfer structure (12). The bipentaprism (10) comprises optical elements (20) and (21) positioned with respect to each other to form an empty pentaprism, and optical elements (22) and (23) positioned with respect to each other to form an empty roof-pentaprism. Similarly, the bipentaprism (11) comprises optical elements (30) and (31) positioned with respect to each other to form an empty pentaprism, and optical elements (32) and (33) positioned with respect to each other to form an empty roof-pentaprism. The optical elements (22) and (32) are beam splitters, while the other optical elements are reflectors. The bipentaprisms (10) and (11) are positioned with respect to each other so that an input beam impinging upon reflecting element (20) of the bipentaprism (10) is reflected to the beam splitter (22), where the input beam is split into a transmitted component and a reflected component. The transmitted and reflected components travel on different paths through the transfer structure (12) to the bipentaprism (11), and emerge therefrom as a pair of output beams. The average direction of the two output beams is precisely referenced in angle to the input beam.

5 Claims, 4 Drawing Figures

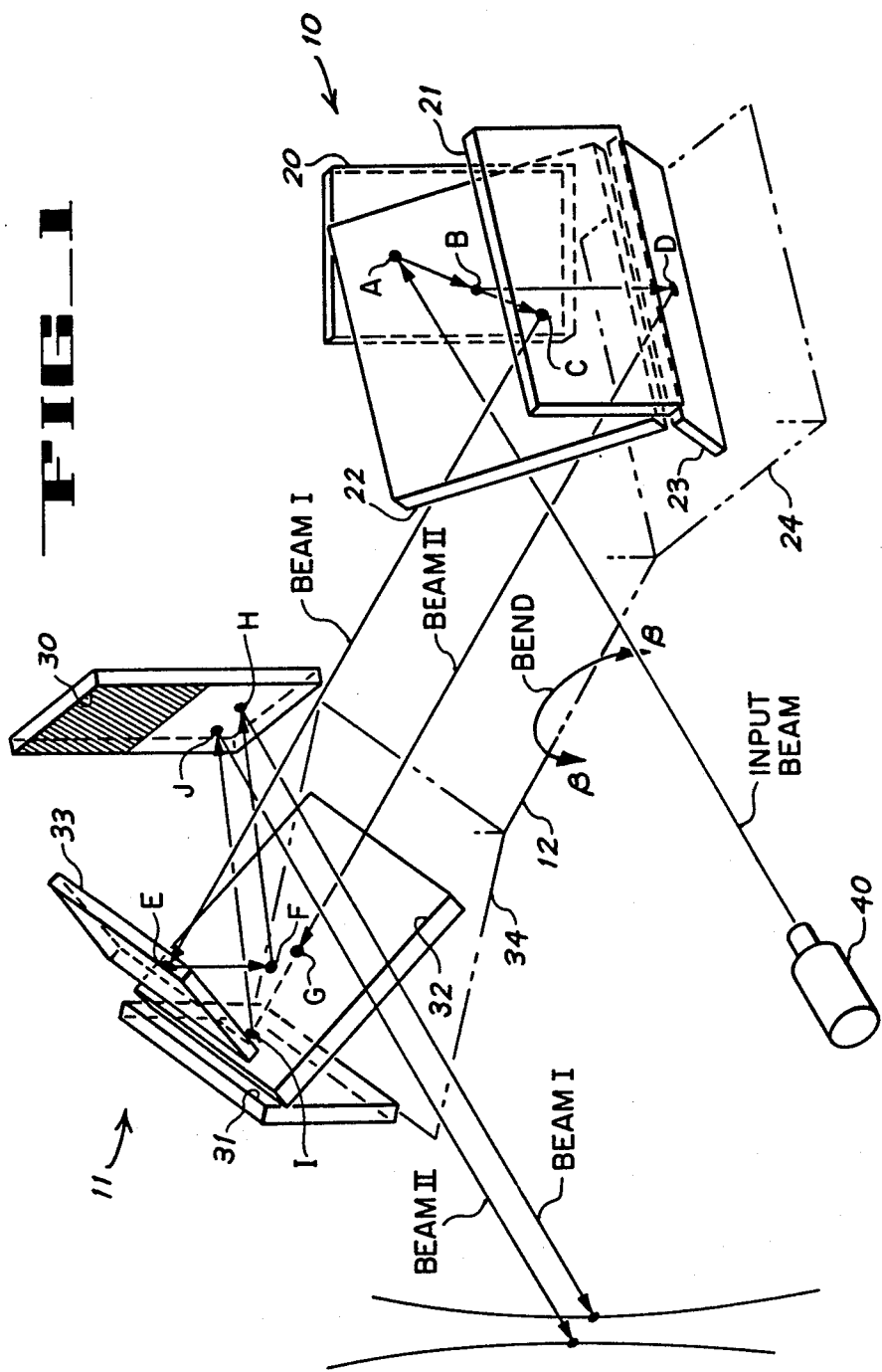

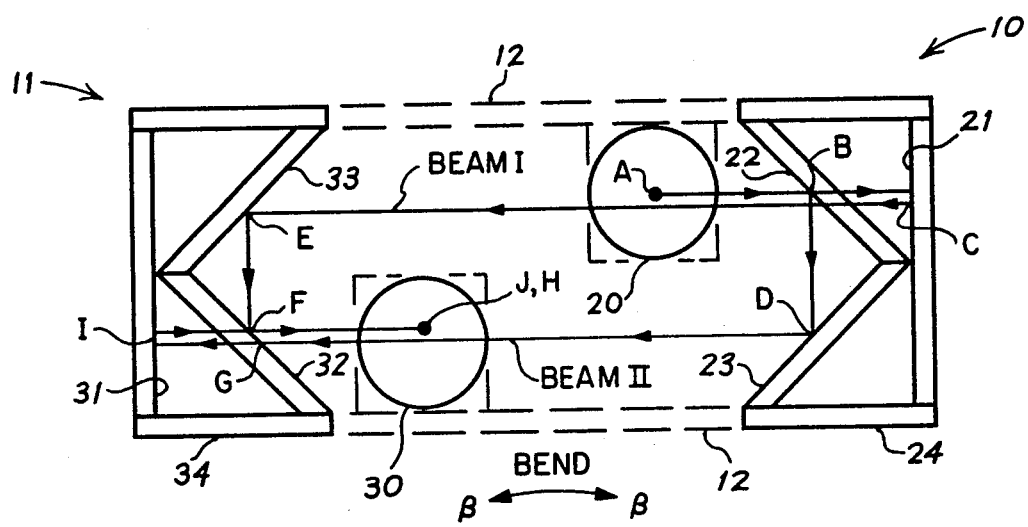
FIG_2
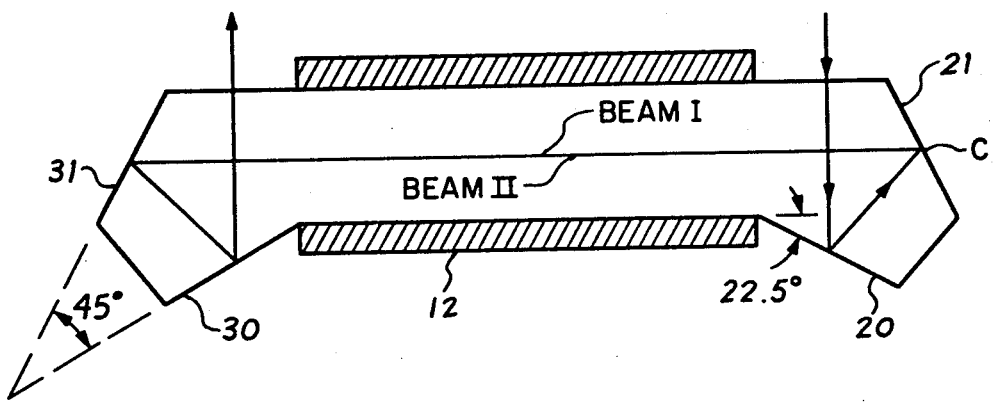
FIG_3

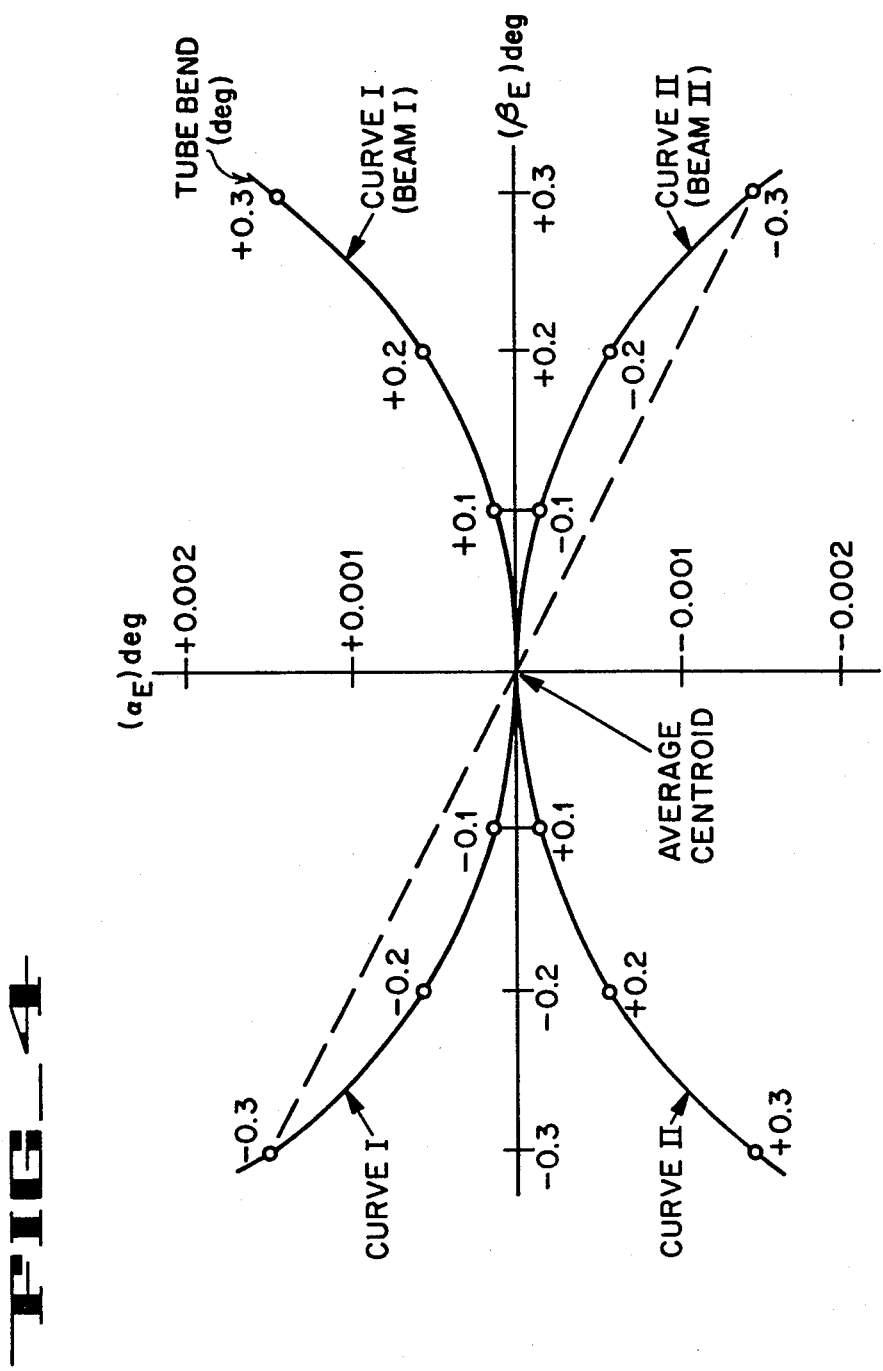
FIG_4

LATERAL TRANSFER SYSTEM FOR AN OPTICAL BEAM

The Government has rights in this invention pursuant to Contract F29601-80-C-0047 awarded by the Department of the Air Force.

TECHNICAL FIELD

This invention relates generally to optical beam transfer systems, and more particularly to retroreflective systems for laterally transferring optical beams.

DESCRIPTION OF THE PRIOR ART

Techniques for laterally transferring an optical beam (e.g., a laser alignment beam) without changing beam direction are of particular interest in space technology. In certain proposed applications, a laser input beam would be displaced, or "transferred", laterally via an elongated transfer structure through a distance of several meters or more, and would emerge as an output beam that is precisely referenced in angle to the input beam.

In a retroreflective lateral transfer system, an optical beam enters an input reflective device located at one end of an elongate transfer structure. The beam is then laterally displaced through the transfer structure to an output reflective device located at the other end of the transfer structure. The displaced beam thereupon emerges from the output reflective device at an angle that is precisely referenced (e.g., antiparallel) to the direction at which the beam entered the input reflective device.

With retroreflective lateral transfer systems available in the prior art, the direction of the "transferred" beam emerging from the output reflective device was sensitive to bending of the transfer structure that connects the input and output reflective devices. For many applications, bending of the transfer structure due to, e.g., mechanical and/or thermal stresses would prevent angular referencing of the output beam with respect to the input beam from being maintained with the required precision.

SUMMARY OF THE INVENTION

It is an object of the present invention to provide a retroreflective lateral transfer system for displacing an optical beam laterally through a large distance.

It is a particular object of the present invention to provide a retroreflective lateral transfer system that can transfer an input beam laterally through a transfer structure of several meters or more in length and produce an output beam, which is precisely referenced in angle to the input beam. In practical application, the present invention can be used for laterally transferring, e.g., a laser beam that furnishes a precise reference (called a "look angle" reference) for aligning two or more optical systems, i.e., for boresighting.

A retroreflective lateral transfer system of the present invention comprises an input reflective device and an output reflective device, which are connected by an elongated transfer structure. The system is configured so that an input beam entering the input reflective device passes through the transfer structure, and emerges from the output reflective device as a pair of output beams. The average direction of the two output beams furnishes a "look angle" reference, which remains precisely referenced in angle to the input beam (i.e., precisely antiparallel to the input beam, or precisely offset from the input beam at some other predetermined angle) regardless of any bending of the transfer structure that might occur.

The present invention is particularly applicable to a retroreflective lateral transfer system using laser beams in space applications. In accordance with the present invention, an input laser beam can be laterally transferred over a distance of several meters or more and emerge as a pair of output beams, whose average direction furnishes a "look angle" reference that is precisely referenced to the input beam to within milliarcsecond accuracy.

The input and output reflective devices of the lateral transfer system of the present invention are bipentaprismatic devices connected by a tubular transfer structure. A bipentaprismatic device, which is in fact a novel kind of optical device that was devised for the present invention, combines the features of an ordinary pentaprism and a roof-pentaprism in a single structure. A bipentaprismatic device could be constructed by positioning a glass pentaprism and a glass right-angle prism in prescribed orientations with respect to each other. Alternatively, and in accordance with the preferred embodiment of the invention, a bipentaprismatic device could be constructed by positioning three planar mirrors and a beam splitter in prescribed orientations with respect to each other, as described hereinafter. A bipentaprismatic device constructed from three planar mirrors and a beam splitter is called an "empty bipentaprism". Regardless of the types of bipentaprismatic devices used in a lateral transfer system according to present invention, the two bipentaprismatic devices are attached to opposite ends of the transfer structure in such a way as to be positioned in prescribed orientations with respect to each other.

It is a feature of a lateral transfer system of the present invention that bending of the transfer structure in any direction within wide operational ranges has no substantial effect on the capability of the system to displace an optical beam laterally through a distance of several meters to emerge as a pair of output beams whose average direction furnishes a "look angle" reference for aligning two or more optical systems.

DESCRIPTION OF THE DRAWING

FIG. 1 is a schematic representation in perspective view of the optical elements of a lateral transfer system in accordance with the present invention.

FIG. 2 is a schematic representation of the lateral transfer system of FIG. 1 in cross-sectional view, where the plane of the cross section is normal to the input and output beams.

FIG. 3 is a schematic representation of the lateral transfer system of FIG. 2 in cross-sectional plan view.

FIG. 4 is graphical representation of the two output beams emerging from the output bipentaprism of the lateral transfer system shown in FIGS. 1, 2 and 3, when the transfer structure connecting the input and output bipentaprisms undergoes bending.

BEST MODE OF CARRYING OUT THE INVENTION

As illustrated in perspective view in FIG. 1, a lateral transfer system according to the present invention for displacing an optical beam comprises an input bipentaprism 10 and an output bipentaprism 11, which are connected together in precise angular orientation with respect to each other by an elongate transfer structure 12.

The input bipentaprism 10 comprises optical elements designated by the reference numbers 20, 21, 22 and 23, which are mounted on a supporting structure 24 in precise relationship with respect to each other. Similarly, the output bipentaprism 11 comprises optical elements designated by the reference numbers 30, 31, 32 and 33, which are mounted on a supporting structure 34 in precise relationship with respect to each other. Structurally, at least with respect to the angular dispositions of their constituent optical elements, the bipentaprisms 10 and 11 are identical.

The transfer structure 12 is represented schematically in FIG. 1 by an idealized planar device to which the bipentaprism supporting structures 24 and 34 are attached. The transfer structure 12 would generally be of tubular configuration enclosing a bore through which the optical beam to be "transferred" (i.e., laterally displaced) is propagated. The transfer structure 12 is ideally rigid, but in practice would be subject to bending when undergoing thermal or vibrational stress. In particular, the transfer structure 12 would tend to bend as indicated by the arrows $\beta$—$\beta$ in FIG. 2. The transfer structure 12 serves to position the constituent optical elements of the input bipentaprism 10 in precise relationship with respect to the corresponding constituent optical elements of the output bipentaprism 11.

The actual configuration and dimensions (including length and diameter) of the transfer structure 12, as well as the configurations and dimensions of the supporting structures 24 and 34, would depend upon the particular application for which the lateral transfer system is used. As a laboratory apparatus to demonstrate the invention, the supporting structures 24 and 34 could be, e.g., box-like structures made of a mechanically stable material such as ULE TM (ultra-low expansion) fused silica, marketed by Corning Glass Work. The constituent optical elements of the bipentaprisms 10 and 11 could be bonded to the ULE supporting structures 24 and 34, respectively, by a stable bonding agent. The transfer structure 12, to which the supporting structures 24 and 34 are bonded, could also be made of ULE material. The choice of materials and bonding techniques (e.g., adhesives, screws, etc.) for constructing a working apparatus in accordance with the invention would be within the competence of workers skilled in the art.

Referring to FIGS. 1, 2 and 3, the optical elements 20, 21, 22 and 23 of the input bipentaprism 10 are arranged to form a so-called empty bipentaprism, which is a novel type of optical device that combines the features of an ordinary pentaprism and a roof-pentaprism. Similarly, the optical elements 30, 31, 32, and 33 of the output bipentaprism 11 are also arranged to form an empty bipentaprism.

An "empty" pentaprism (as distinguished from a solid glass pentaprism) is formed by two 45° dihedral mirrors, i.e., by two reflecting surfaces disposed perpendicular to a common plane and inclined at 45° to each other. Thus, in the bipentaprism 10, the optical elements 20 and 21 comprise reflecting surfaces that are positioned with respect to each other to form a pentaprism. Similarly, in the bipentaprism 11, the optical elements 30 and 31 comprise reflecting surfaces that are positioned with respect to other each to form a pentaprism.

An "empty" roof-pentaprism (as distinguished from a solid glass roof-pentaprism) is formed by replacing one of the reflecting surfaces of an empty pentaprism by two reflecting surfaces that intersect each other at 90°, where each of the two "replacement" reflecting surfaces is inclined at 45° to the plane of the reflecting surface that is being replaced. The two "replacement" reflecting surfaces, together with the other reflecting surface of the pentaprism, define the roof-pentaprism. The two "replacement" reflecting surfaces are seemingly configured as a roof, from which the designation "roof-pentaprism" is derived.

In a bipentaprism according to the present invention, two "replacement" reflecting surfaces (i.e., the roof elements), which convert an ordinary pentaprism into a roof-pentaprism, intersect each other in a line lying in the plane of the "replaced" reflecting surface. This line of intersection of the two "replacement" reflecting surfaces is inclined at 45° to the other reflecting surface of the pentaprism. The so-called "replaced" reflecting surface, however, is not removed in forming a bipentaprism.

FIGS. 1, 2 and 3, the roof elements 22 and 23 may be considered has having "replaced" the reflecting element 21, thereby forming a roof-pentaprism comprising the optical elements 20, 22 and 23. Similarly, the roof elements 32 and 33 may be considered as having "replaced" the reflecting element 31, thereby forming a roof-pentaprism comprising the optical elements 30, 32 and 33. However, in accordance with the present invention, the reflecting elements 21 and 31 are not eliminated. The reflecting element 21 is retained for use in conjunction with the roof elements 22 and 23; and similarly, the reflecting element 31 is retained for use in conjunction with the roof elements 32 and 33.

In each of the bipentaprisms 10 and 11, one of the two roof elements is substantially completely reflective; the other one of the two roof element is only partially reflective, and functions as a beam splitter. Thus, in FIGS. 1, 2 and 3, the roof elements 22 and 32 of the bipentaprisms 10 and 11, respectively, are only partially reflective and function as beam splitters. It may be assumed that the beam splitter elements 22 and 32 transmit approximately 68% and reflect approximately 32% of the optical energy incident thereon. The actual ratio of transmitted to reflected optical energy, however, would depend upon the nature of the reflective coating used in fabricating the beam splitter elements 22 and 32. There is no requirement for any particular ratio of transmitted to reflected optical energy, other than the general requirement that both the transmitted and the reflected beams must have sufficient intensity to be detectable in accordance with the purpose of the lateral transfer system.

Referring to FIG. 1, the reflecting elements 20 and 21 of the input bipentaprism 10 are both perpendicular to a common plane (viz., the plane of the bottom portion of the supporting structure 24), and intersect each other at an angle of 45°. The roof elements 22 and 23 are perpendicular to each other, and each is inclined at an angle of 45° to the bottom portion of the supporting structure 24. The line of intersection of the roof elements 22 and 23 is inclined to the plane of the reflecting element 20 at an angle of 45°.

Similar angular relationships obtain for the corresponding reflecting elements 30 and 31, and for the roof elements 32 and 33, of the output bipentaprism 11, since the bipentaprisms 10 and 11 are structurally identical. Thus, the reflecting elements 30 and 31 are both perpendicular to a common plane (viz., the plane of the bottom portion of the supporting structure 34), and intersect each other at an angle of 45°. Also, the roof elements 32 and 33 are perpendicular to each other, and each is inclined at an angle of 45° to the bottom portion of the supporting structure 34. The line of intersection of the roof elements 32 and 33 is inclined to the plane of the reflecting element 30 at an angle of 45°.

In the embodiment of the invention as shown in the drawing, the orientation of the input bipentaprism 10 with respect to the output bipentaprism 11 is fixed by securing the two bipentaprisms 10 and 11 to opposite ends of the elongate transfer structure 12 in such a way that normals to the reflecting elements 21 and 31 are coplanar and intersect each other at an angle of 135°. It is to be recognized, however, that other configurations are possible. For example, the bipentaprisms 10 and 11 could be rotated by equal amounts in opposite directions, so that the normals to the reflecting elements 21 and 31 intersect each other at some angle other than 135°.

The function of the bipentaprisms 10 and 11 can be appreciated by tracing the split paths taken by an optical beam that is being displaced (i.e., transferred) through the lateral transfer system, as shown in FIG. 1. An optical beam (e.g., a collimated laser beam) from a source 40 is directed as an input beam at a desired angle of incidence (normally 22.5° in the drawing) onto the reflecting element 20 of the input bipentaprism 10. This input beam is represented in FIG. 1 by a ray, which impinges upon the reflecting element 20 at point A. The ray representing the input beam is thereupon reflected by the reflecting element 20 to point B on the beam splitter element 22, whereupon the input beam is split into a transmitted component and a reflected component.

The ray representing the transmitted component of the input beam (designated BEAM I in FIGS. 1 and 2), upon being transmitted through the beam splitter element 22, impinges upon the reflecting element 21 at point C. Refraction of the transmitted beam component can ordinarily be ignored, because lateral motion of a substantially collimated beam produces no significant angular effects. The ray representing the reflected component of the input beam (designated BEAM II in FIGS. 1 and 2), upon being reflected by the beam splitter element 22, impinges upon the roof element 23 at point D.

The ray representing the transmitted component of the input beam (i.e., BEAM I) is reflected by the reflecting element 21 to point E on the roof element 33 at the other end of the transfer structure 12. At the roof element 33, BEAM I is reflected to point F on the beam splitter element 32. Meanwhile, BEAM II is reflected by the roof element 23 to point G on the beam splitter element 32. It is to be noted that the input beam from the source 40 has a finite diameter, and might fill a major portion of the reflecting element 20. The transmitted and reflected components of the input beam likewise have finite diameters, which substantially equal the diameter of the input beam.

At point F on the beam splitter element 32, BEAM I is split into a transmitted portion and a reflected portion. The transmitted portion of BEAM I passes out of the lateral transfer system, and may be absorbed by a component or components of the supporting structure 34. The reflected portion of BEAM I is reflected by the beam splitter element 32 so as to impinge upon the reflecting element 30 at point H. Upon reflection from the reflecting element 30, this reflected portion of BEAM I emerges from the output bipentaprism 11 in a direction that is nominally antiparallel to the direction of the input beam from the source 40.

Meanwhile, at point G on the beam splitter element 32, BEAM II is split into a transmitted portion and a reflected portion. The ray representing the portion of BEAM II reflected from point G follows a path (not shown in the drawing) toward the roof element 33, and thence (after reflection from the roof element 33) toward the reflecting element 30. In the embodiment of the invention shown in FIG. 1, the reflecting element 30 has a non-reflecting surface region (indicated by shading in the drawing), which is positioned to intercept and absorb the portion of BEAM II reflected from point G. However, in an alternative embodiment of the invention, the portion of BEAM II reflected from point G would follow a path toward the roof element 33 and thence (after reflection from the roof element 33) toward a reflecting surface region of the reflecting element 30. In this alternative embodiment, the portion of BEAM II reflected to the reflecting element 30 would be reflected therefrom for use as an alignment reference.

The ray representing the transmitted portion of the beam component incident upon the beam splitter element 32 at point G (i.e., the transmitted portion of BEAM II) impinges upon the reflecting element 31 at point I, and is thereupon reflected back to the beam splitter element 32. At the beam splitter element 32, the transmitted portion of BEAM II reflected from the reflecting element 31 undergoes a further split into a transmitted part and a reflected part. The reflected part passes out of the lateral transfer system, and may be absorbed by a component or components of the support structure 34. The ray representing the transmitting part, i.e., the part of the transmitted portion of BEAM II that passes through the beam splitter element 32 from the rear, arrives at point J on the reflecting element 30. Upon reflection from the reflecting element 30, this transmitted part of the transmitted portion of BEAM II emerges from the output bipentaprism 11 in a direction that is nominally antiparallel to the direction of the input beam from the source 40.

The ray representing the portions of BEAMS I and II that impinge upon the reflecting element 30 at points H and J, respectively, emerge from the output bipentaprism 11 parallel to each other in a direction that is nominally antiparallel to the input beam generated by the source 40. In the drawing, the points H and J are shown spaced apart, and the rays impinging upon the reflecting element 30 at points H and J are offset from each other for illustrative purpose. The portions of BEAMS I and II actually impinging upon the reflecting element 30, however, may partially or completely overlap each other. Both of the collimated beams emerging from the output bipentaprism 11 by reflection from the reflecting element 30 are to be considered as output beams of the lateral transfer systems. The average direction of these two output beams represents the direction of the laterally "transferred" beam.

The paths of BEAM I and II through the lateral transfer system as described above with reference to FIG. 1 can be seen from a different perspective by reference to FIG. 2. A ray representing the input beam is directed into the plane of the paper in FIG. 2 so as to impinge upon the mirror 20 at point A at an incident angle of 22.5°. This ray is then reflected from the mirror 20 toward the beam splitter 22, and impinges upon the beam splitter 22 at point B. At the beam splitter 22, the input beam reflected from the mirror 20 is split into a transmitted component and a reflected component. The ray representing the transmitted component of the input beam in the configuration shown in FIG. 2 passes through the beam splitter 22 to impinge upon the mirror 21 at point C at an incident angle of 22.5°. This ray, labelled BEAM I in the drawing, is reflected back through the beam splitter 22, and travels through the elongated transfer structure 12 toward the mirror 33 at the other end of the transfer structure 12. The ray designated as BEAM I impinges upon the mirror 33 at point E, and is reflected therefrom to point F on the beam splitter 32. BEAM I is thereupon split into a transmitted portion and a reflected portion. The transmitted portion of BEAM I passes out of the lateral transfer system. The reflected portion of BEAM I impinges upon the mirror 30 at point H, and is reflected therefrom as an output beam perpendicular to the plane of the paper and nominally antiparallel to the input beam.

In summary, it is seen from FIG. 2 that BEAM I travels a path from the pentaprism elements 20 and 21 of the input bipentaprism 10 to the roof-pentaprism elements 33, 32 and 30 of the output bipentaprism 11.

The ray representing the reflected component of the input beam in FIG. 2 is reflected from the beam splitter 22 toward the mirror 23, and impinges upon the mirror 23 at point D. This ray, labelled BEAM II in the drawing, is then reflected through the elongate transfer structure 12 toward the beam splitter 32 at the other end of the transfer structure 12. BEAM II impinges upon the beam splitter 32 at point G, and is split into a transmitted portion and a reflected portion. The reflected portion of BEAM II is disregarded in FIG. 2, and is treated as passing out of the lateral transfer system. The ray representing the transmitted portion of BEAM II impinges upon the mirror 31 at point I, and is reflected therefrom to point J on the mirror 30. At the mirror 30, the transmitted portion of BEAM II is reflected out of the lateral transfer system as an output beam perpendicular to the plane of the paper and nominally antiparallel to the input beam.

In summary, it is also seen from FIG. 2 that BEAM II travels a path from the roof-pentaprism elements 20, 22 and 23 of the input bipentaprism 10 to the pentaprism elements 31 and 30 of the output bipentaprism 11.

In the embodiment of the invention as shown in FIG. 2, the points H and J on mirror 30 are shown as coinciding. The reflected portion of BEAM I and the transmitted portion of BEAM II, whose rays are shown impinging upon the mirror 30 at the points H and J, respectively, overlap each other either partially or completely, and are reflected from the mirror 30 as output beams. The output beams from the mirror 30 may be nominally parallel as in the embodiment in the drawing, or they may have a prescribed angular offset in order to facilitate detection of the directions of the individual output beams.

The paths of BEAMS I and II through the lateral transfer system can be seen from yet another perspective in FIG. 3, which is a plan view of the system as shown in FIGS. 1 and 2.

As long as the elongate transfer structure 12 remains substantially rigid, both output beams represented in the drawing by the rays reflected from points H and J on the reflecting element 30 remain parallel to each other. However, if the transfer structure 12 were to undergo bending as indicated by the arrows β—β in FIGS. 1 and 2, the beams represented by the rays reflected from points H and J would diverge from each other in a precisely symmetrical manner. The nature of this divergence is illustrated graphically in FIG. 4, where the horizontal axis represents the deviation angle (in degrees) of the two output beams from the input beam measured laterally to the axis of the transfer structure 12, and the vertical axis represents the deviation angle (in degrees) of the two output beams from the input beam measured orthogonally to the axis of the transfer structure 12. The extent of bending of the transfer structure 12 is indicated by the distance of the two output beams from the origin along curves I and II.

Curve I in FIG. 4 indicates the output angle of BEAM I with respect to the input beam, and curve II indicates the output angle of BEAM II with respect to the input beam. The position at the origin of the coordinate system, where curves I and II intersect, indicates precise parallelism of both output beams with respect to each other. As the beam reflected from point H undergoes angular deviation in one direction or the other due to bending of the transfer structure 12, the changing position of that beam is represented by corresponding points on curve I. Similarly, as the beam reflected from point J undergoes angular deviation, the changing position of that beam is represented by corresponding points on curve II. The geometrical relationships of the optical components of the lateral transfer system of the present invention are such that a movement to the left along curve I of the point representing the beam reflected from point H corresponds to a movement to the right along curve II of the point representing the beam reflected from point J and vice versa. The average angular centroid of the two output beams defines the angles of the laterally transferred "look angle" reference, which is parallel to the input beam and is independent of any bending of the transfer structure 12 that might occur.

The output from the lateral transfer system of the present invention comprises two collimated beams, which may be focussed to accomplish image centroiding of each beam independently. It might be advantageous in a particular embodiment of the invention to construct the optical elements of the lateral transfer system in such a way as to introduce a small static angular offset to the two output beams.

In an alternative embodiment of the present invention, the roof elements 22 and 23 of the input bipentraprism 10 are both beam splitters, and the reflecting element 21 is enlarged to reflect the input beam components transmitted by both roof elements 22 and 23. In this alternative embodiment, a single input beam fills the pair of roof elements 22 and 23, rather than filling only the single roof element 22 as described above. Corresponding changes would be made with respect to the roof elements 32 and 33 of the output bipentaprism 11.

In another alternative embodiment of the invention, the input and output bipentaprisms 10 and 11 are rotated equally in the plane of FIG. 3, so that the intersection of the planes of the optical elements 20 and 30 is a design parameter of the system.

In yet another alternative embodiment of the invention, the reflecting element 21 of the input bipentaprism 10 is replaced by a beam splitter element, which is positioned in front of the roof elements 22 and 23. Both of the roof elements 22 and 23 would be substantially completely reflective (i.e., roof element 22 would not be a beam splitter). Similarly, the reflecting element 31 of the output bipentaprism 11 is replaced by a beam splitter element, which is positioned in front of the roof elements 32 and 33. Both of the roof elements 32 and 33 would be substantially completely reflective (i.e., roof element 32 would not be a beam splitter). The changed disposition of the various optical elements in this alternative embodiment would result in different relative positions of the beam components within the transfer structure 12, but would not generally change the capabilities of the lateral transfer system.

Various embodiments have been described herein for an optical beam lateral transfer system in accordance with the present invention. The dimensions of the constituent elements of the bipentaprisms, as well as the configurations of the supporting structures for the bipentaprisms, would depend upon the application intended for the invention. Other embodiments suitable for particular applications would become apparent to workers skilled in the art upon perusal of the foregoing specification and accompanying drawing. Thus, the description presented herein is to be understood as illustrative of the invention. The invention is more generally defined by the following claims and their equivalents.

I claim:

1. A bipentaprism comprising:
   (a) a first reflecting element and a second reflecting element, said first and second reflecting elements being positioned with respect to each other to form a pentaprism; and
   (b) a reflective roof element and a beam splitting roof element, said roof elements being positioned with respect to each other to form a roof-pentaprism with said first reflecting element.

2. A lateral transfer system for an optical beam, said lateral transfer system comprising a first bipentaprism and a second bipentaprism, each of said bipentaprisms comprising:
   (a) a first reflecting element and a second reflecting element, said first and second reflecting elements being positioned with respect to each other to form a pentaprism; and
   (b) a reflective roof element and a beam splitting roof element, said roof elements being positioned with respect to each other to form a roof-pentaprism with said first reflecting element;
   said first and second bipentaprisms being secured to an elongate transfer structure so that an input beam entering said first bipentaprism is split by said first bipentaprism and propagated as two beam components through said transfer structure to said second bipentaprism, said second bipentaprism producing two output beams whose average direction is substantially antiparallel to said input beam.

3. A lateral transfer system for an optical beam, said lateral transfer system comprising a first bipentaprism and a second bipentaprism, each of said bipentaprisms comprising:
   (a) a first reflecting element and a second reflecting element, said first and second reflecting elements being disposed perpendicularly to a common plane and inclined to each other at 45°; and
   (b) a reflective roof element and a beam splitting roof element, said roof elements being perpendicular to each other, each of said roof elements intersecting said second reflecting element at 45°;
   said first and second bipentaprisms being secured to opposite ends of an elongate transfer structure so that the normal to the first reflecting element of said first bipentaprism and the normal to the first reflecting element of said second bipentaprism intersect each other at 45°.

4. A bipentaprism comprising:
   (a) first and second optical elements positioned with respect to each other to form a pentaprism, and
   (b) third and fourth optical elements positioned with respect to each other to form a roof-pentaprism with said first optical element,
   one of said first, second third and fourth optical elements functioning as a beam splitter, and the others of said optical elements being substantially reflective.

5. A lateral system for an optical beam, said lateral transfer system comprising a first bipentaprism and a second bipentaprism, each of said bipentaprisms comprising:
   (a) first and second optical elements positioned with respect to each other to form a pentaprism, and
   (b) third and fourth optical elements positioned with respect to each other to form a roof-pentaprism with said first optical element,
   one of said first, second, third and fourth optical elements functioning as a beam splitter, and the others of said optical elements being substantially reflective, said first and second bipentaprisms being secured to an elongate transfer structure so that an input beam entering said first bipentaprism is split by said first bipentaprism and propagated as two beam components through said transfer structure to said second bipentaprism, said second bipentaprism producing two output beams whose average direction is substantially antiparallel to said input beam.

* * * * *